United States Patent [19]
McQuarrie et al.

[11] 3,844,474
[45] Oct. 29, 1974

[54] SPRING LOADED RESET MECHANISM FOR A DEMAND METER

[75] Inventors: Alexander M. McQuarrie; Donald M. Ham, both of Rochester, N.H.

[73] Assignee: General Electric Company, New York, N.Y.

[22] Filed: May 31, 1973

[21] Appl. No.: 365,553

[52] U.S. Cl. ................. 235/144 MA, 324/103 R
[51] Int. Cl. ................................... G01r 19/16
[58] Field of Search ............... 235/104, 144 MA; 324/103 R

[56] References Cited
UNITED STATES PATENTS

| | | | |
|---|---|---|---|
| 2,123,943 | 7/1938 | Hamill | 235/144 MA |
| 2,123,944 | 7/1938 | Hamill | 235/144 MA |
| 2,280,161 | 4/1942 | Rosenberger | 235/144 MA |
| 3,721,901 | 3/1973 | Ham | 235/144 MA |

*Primary Examiner*—Stephen J. Tomsky
*Attorney, Agent, or Firm*—John J. Kelleher; Francis X. Doyle; Volker R. Ulbrich

[57] ABSTRACT

A cover mounted demand meter reset actuator that limits the amount of torque applied to the mechanisms associated with the reset function thus preventing damage to said mechanisms.

5 Claims, 6 Drawing Figures

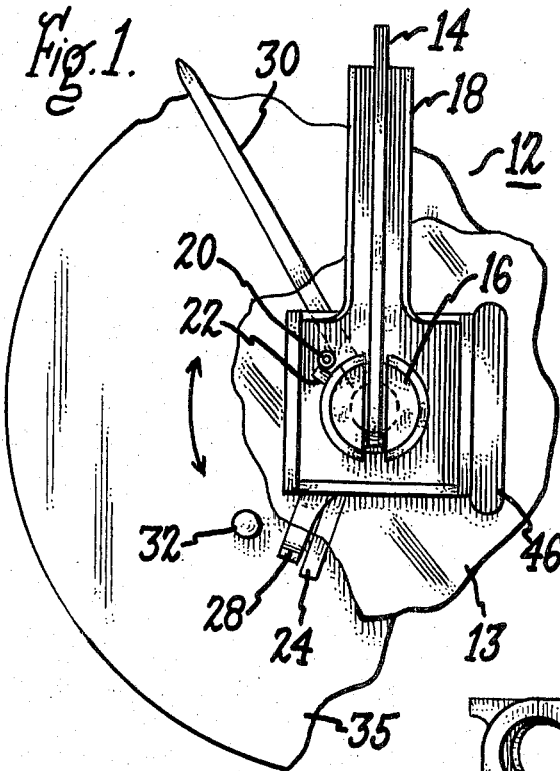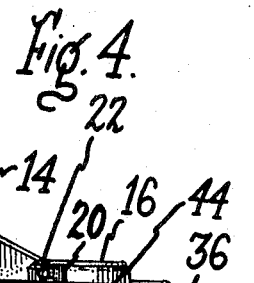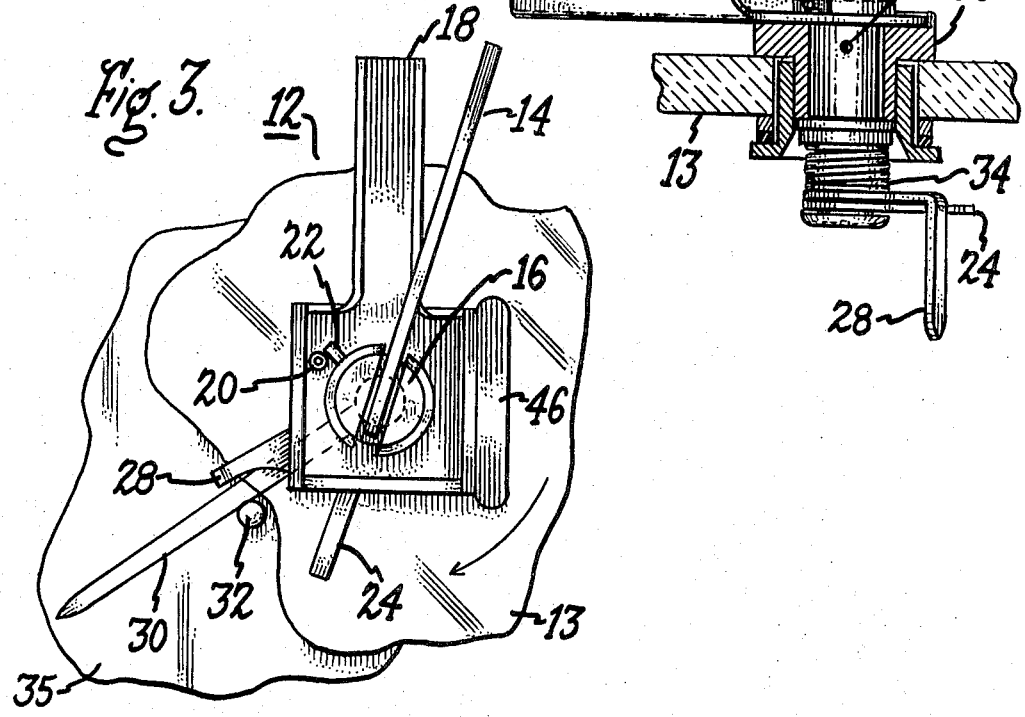

3,844,474
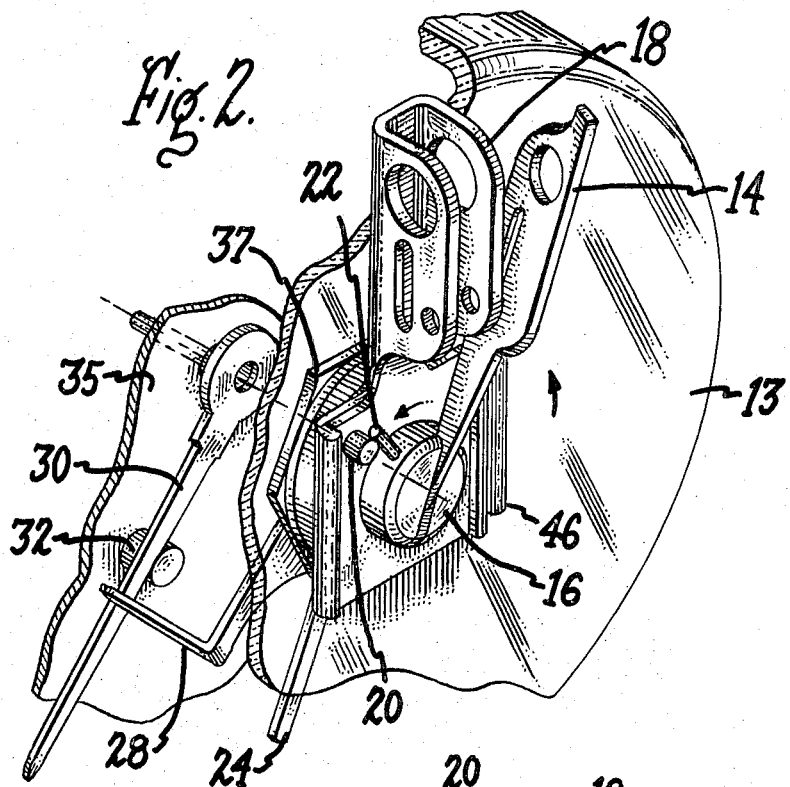
Fig. 2.
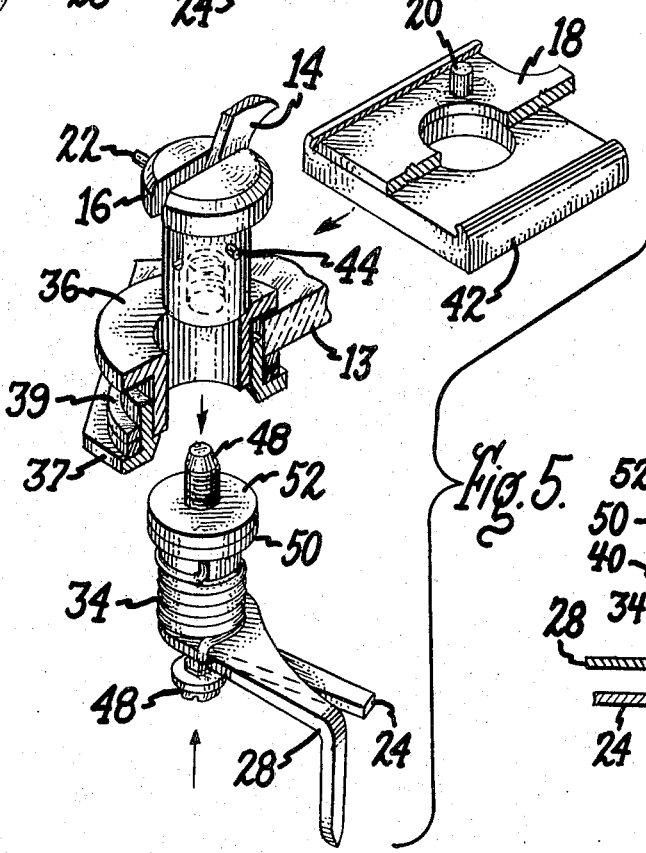
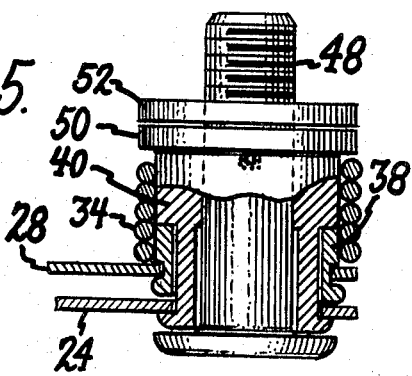
Fig. 5.
Fig. 6.

SPRING LOADED RESET MECHANISM FOR A DEMAND METER

BACKGROUND OF THE INVENTION

The invention relates to a kilowatt demand indicating meter and, more particularly, to a reset actuator for manually returning a watthour consumption pointer, indicating the maximum watthours used during a given interval of time, to a zero indication position.

Kilowatt demand meters are well known in the prior art. A common type of demand meter currently in use by the electric utility industry is a conventional watthour meter mechanism, in combination with a timing element, to sum up the kilowatt hours of energy measured by the meter in a pre-selected time span called a demand interval. Usually a demand interval of 15 or 30 minutes is selected for such meters. In order to indicate the maximum power demand on a customer's system in a given billing period, such as during a one-month span, an indicating mechanism is incorporated in all demand meters. One conventional form of such an indicating mechanism comprises a simple pointer-pusher device that pushes an indicating pointer up-scale as it is rotated by the watthour mechanism during a given demand interval. Thus, the pointer will indicate the maximum power demand measured by the meter during any demand interval occurring in the billing period. At the end of a billing period the indicating pointer is reset to its zero position.

In addition to utilizing a single rotatable indicating pointer to indicate demand measurements, it is common practice to provide demand meters with dial registers having a plurality of rotatable indicating pointers that are connected to a decade-type gear train which are driven in an up-scale direction by being coupled through a drive gear train to the abovementioned mentioned type of pointer-pusher demand meter mechanism.

After obtaining the desired billing information the demand meter pointer indicator/dial register combination, is manually reset at the end of a billing period. This is accomplished in a fairly conventional manner by rotating the demand meter cover mounted reset actuator manually in a counterclockwise (down scale) direction until the pointer indicator engages the reset stop.

In one type of demand meter of the type described in U.S. Pat. No. 3,092,318 in the name of one of the present inventors, when resetting the sngle indicating pointer to the zero position the maximum number of watthours consumed during any demand interval in a billing period is cumulated on the above-mentioned dial registers.

One problem associated with prior art rest actuators is that in resetting the register it is possible to apply an excessive amount of torque which may bend or damage components associated with the reset function.

Another problem inherent in relatively rigid prior art demand meter cover reset arms is that a right hand thread screw could not be used in assembling the cover reset arm, a very desirable assembly feature, as it is possible to apply more than enough torque to cause said screw to turn. This causes loosening of the reset assembly thereby preventing any further transmission of torque to reset the meter.

Another problem associated with prior art reset actuators is the incomplete resetting of the pointer. The practice of some meter readers apparently has been to hurriedly flip the cover reset actuator in a counterclockwise direction and in so doing the pointer may bounce back from the reset stop, causing some registration on the pointer indicator.

SUMMARY OF THE INVENTION

A primary object of the present invention is to provide a spring loaded reset actuator for preventing excessive torque from being applied to components associated with the demand meter reset function.

Another object of the invention is to provide a demand meter cover mounted reset actuator capable of being assembled with a screw having a right hand thread.

Still another object of the invention is to provide a spring loaded demand meter reset actuator that prevents any bounce of the pointer when the pointer is reset.

A demand meter cover, reset actuator is provided capable of limiting the amount of torque applied to components associated with a demand meter reset function. The reset actuator is rotatably mounted to and extends through the meter cover with a pair of arms, one rigidly and the other rotatably attached to the inner end of said actuator. The rotatable arm is urged against the rigidly attached arm by a torsional spring and said rotatable arm engages the pointer indicator as the reset actuator is rotated in a counterclockwise or down scale direction toward the pointer indicator stop. If the actuator is rotated beyond the point where the pointer indicator engages the pointer indicator stop, the movable arm on the actuator will hold the pointer indicator against the pointer indicator stop and the above-mentioned torsional spring will be compressed as the rigidly attached arm continues to move in a down scale direction. Counterclockwise rotation of the actuator is terminated when a stop on the rotating portion of the actuator engages a stop on the fixed or mounting portion of said actuator, thus the entire actuator mechanism limits the amount of torque that can be applied to meter reset components through a predetermined actuator rotation angle.

The invention which is sought to be protected will be particularly pointed out and distinctly claimed in the claims appended thereto. However, it is believed that this invention and the manner in which its objects and advantages are obtained, as well as other objects and advantages thereof, will be more readily understood by reference to the following detailed description of preferred embodiments thereof particularly when considered in the light of the accompanying drawings.

BRIEF DESCRIPTION OF THE DRAWINGS

FIG. 1 is a front view of the reset actuator of the present invention in its pre-reset state showing the pointer indicator indicating the power consumed during a demand interval.

FIG. 2 is a perspective view of the reset actuator engaging the pointer indicator rotated to the full counterclockwise position, showing the torque limiting feature of the present invention.

FIG. 3 is a front view of the reset actuator of the present invention shown in the same rotational position as in FIG. 2.

FIG. 4 is a side elevation, partly in section, of the reset actuator of the present invention shown in the same rotational position as in FIG. 2.

FIG. 5 is an exploded perspective view, partly in section, indicating the manner in which the reset actuator of the present invention, as best shown in FIG. 2, is attached to the meter cover.

FIG. 6 is a detail showing of the mounting means for the reset actuator arms.

DESCRIPTION OF THE PREFERRED EMBODIMENT

Referring now to the drawings, wherein like numerals are used to indicate like parts throughout, in FIG. 1 the actuator 12 of the present invention is shown in the prereset or initial position. The actuator 12 is rotatably mounted on a meter cover 13, said meter cover being demountably attached to a meter base (not shown), the combination forming a meter housing. Actuator handle 14, which is connected to torque shaft 16 is shown cradled in locking plate 18 in the full clockwise position such that a stop 20, mounted in a fixed position on locking plate 18, engages stop 22 which is mounted in a fixed position on torque shaft 16. Torque shaft 16 is rotatably mounted to and extends through meter cover 13 having one end called the outer end external to the meter cover and another end called the inner end internal to said meter cover. Arm 24 is rigidly connected to torque shaft 16 near the inner end of said torque shaft and another arm 28 is rotatably connected to torque shaft 16 also near the inner end of said torque shaft. Arm 28 is urged against arm 24 by a helical spring which will be described more fully later. The pointer indicator arm 30, which functions as a combination demand interval power consumption indicator and reset arm is shown indicating the power consumed during a demand interval. Actuator handle 14 is pivotally connected to the outer end of shaft 16 for applying a torque to shaft 16. Any equivalent device such as a screw driver inserted in the outer end of torque shaft 16 could be substituted for handle 14.

FIGS. 2 – 4 show the reset actuator 12 of the present invention in the full reset position. This is best depicted in FIG. 3 where actuator handle 14 has been pivoted out of the cradle portion of locking plate 18 and has been rotated to the full counterclockwise position to the point where stop 22 on torque shaft 16 engages stop 20 on locking plate 18. Arm 24 which is rigidly connected to torque shaft 16 is shown rotated out of engagement with arm 28. This occurred because during the counterclockwise rotation of reset actuator 12, arm 28 engaged reset arm 30. Reset arm 30 in turn moved counterclockwise or down scale as a result of torque being applied to same by arm 28 through the path comprising actuator handle 14, torque shaft 16, arm 24, and the helical spring 34 (FIG. 4) that urges arm 28 against arm 24. At the point where the reset arm 30 engages stop 32, arm 28 is prevented from rotating because stop 32 is rigidly attached to meter face 35 and meter face 35 (FIG. 2) is mounted internally to the meter housing in a spatial relation to said meter housing. With torque continuing to be applied at this point, sufficient to overcome the force of helical spring 34, arm 24 will continue to move until stop 22 on torque shaft 16 engages stop 20 on locking plate 18. This continued movement of arm 24 away from arm 28 in the manner just described with arm 28 urged against reset arm 30, but not rotating, demonstrates the torque limiting feature of the present invention. The maximum value of torque that will be applied during reset is directly proportional to the spring constant of the actuator mounted helical spring 34. In this regard, it should be pointed out that it is not critical for spring 34 to be helical in shape. What is important are the requirements that spring 34 be capable of transmitting a torsional force of sufficient magnitude to keep the reset arm 30 from bouncing on the reset stop 32 and have a spring constant capable of limiting the force transmitted to the reset mechanism to a value that will not damage components associated with the reset function.

At this point, it is appropriate to turn to FIGS. 5 and 6 for a description of how the various components of the preferred embodiment of the actuator are assembled and function at the component level and then for a description of how the entire actuator is assembled on the demand meter cover.

Referring now to FIG. 5, actuator bearing 36 having the shape of a hollow cylinder with a collar at one end is inserted through a hole in meter cover 13, adapted to receive same, to the point where the collar portion of bearing 36 meets cover 13, said collar portion being external of meter cover 13. A washer 39 is placed over that portion of bearing 36 that extends through meter cover 13, the washer being inside cover 13. Bearing nut 40, having internal right hand threads, is screwed onto bearing 36, said bearing having cooperating external right hand threads. Bearing nut 37, having a hexagonal collar on one end and a shank portion of such a size that the shank portion of nut 37 passes through washer 39 to the point where the hexagonal collar portion of nut 37 forces washer 39 and the collar portion of bearing 36 firmly against meter cover 13.

Referring now to FIG. 6, a bushing 38 is shown as a generally hollow cylindrical shape structure having two different external diameters. The smaller diameter end of bushing 38 is passed through a hole in one end of arm 28 adapted to pass same, but small enough not to pass the larger end of bushing 38. The smaller portion of bushing 38 is inserted to the point where the larger diameter portion of bushing 38 meets arm 28. The smaller end of bushing 38 is then flared thereby rigidly attaching bushing 38 to arm 28. Bushing 40 is similar to bushing 38 in that bushing 40 has a generally hollow cylindrical shape with two different external diameters. The smaller diameter end of bushing 40 is passed through the center of bushing 38. Bushing 38 is of appropriate size to pass this smaller diameter portion of said bushing 40, but is not large enough to pass the larger diameter portion. This smaller diameter of bushing 40 is then passed through a hole in one end of arm 24 adapted to pass same. The small diameter end of bushing 40 is also flared such that arm 24 is rigidly attached to bushing 40. Bushing 38 is now concentric with and rotatably with respect to bushing 40. Helical spring 34 is placed external to and generally concentric with bushings 38 and 40. One end of spring 34 engages arm 28 and the other end of spring 34 engages bushing 40 resulting in a torsional force between arm 28 and bushing 40. As previously noted, bushing 40 is rigidly attached to arm 24, therefore, spring 34 puts a torsional force between arm 24 and arm 28 such that arm 28 is urged against arm 24.

Again referring to FIG. 5, locking clamp 42 is shown generally square in shape and having a channeled top adapted to receive the generally square end of locking plate 18, both having circular holes through their smallest dimension for passing the shank portion of torque shaft 16 therethrough. Locking plate 18 is mounted on locking clamp 42 by sliding locking plate 18, with stop 20 on plate 18 extending away from clamp 42, into the channel on top of locking clamp 42 to the point where the hole in plate 18 is aligned with the hole in clamp 42 and the generally square portion of plate 18 is symmetrically positioned over clamp 42. At this point, the channel edges on clamp 42 are bent over onto plate 18 thereby rigidly attaching plate 18 to clamp 42.

Still referring to FIG. 5, torque shaft 16 having a round head at one end and having a shank portion is shown with a slot through the head end and having a threaded hole at the opposite end for receiving a right hand screw. Actuator handle 14 having a hole at one end is inserted into the slotted end of shaft 16 and is pivotally connected to said shaft by pin 44 passing through both a hole near the slotted end of shaft 16, adapted to receive same, and the hole at the end of handle 14.

Having described the various components, there will now be a description of how these components are assembled on meter cover 13. Referring to FIGS. 4 and 5, plate 18 and clamp 42 in combination are placed against the collar portion of bearing 36, with stop 20 extending away from bearing 36, such that the holes through plate 18 and clamp 42 are aligned with the longitudinal axis of bearing 36. One edge of clamp 42 is also placed adjacent shoulder 46 which forms a part of cover 13. Shaft 16 is inserted through plate 18, clamp 42 and bearing 36 to the point where the head of shaft 16 meets plate 18. Screw 48 is inserted through the previously described bushing 38, bushing 40, and helical spring 34 combination in a direction generally parallel to the rotational axis of these components. A rigid washer 50 such as steel and a resilient washer 52 such as teflon are then placed over that portion of the threaded end of screw 48 that extends through the aforementioned combination in that order. Screw 48 is then screwed into the internally threaded hole at the end of shaft 16 to the point where arm 24 becomes rigidly attached to shaft 16. Arm 24 may be placed at any rotational angle with respect to handle 14. In actual practice, the arms are not in the position shown in the drawings and are only shown in this position for the sake of clarity. It should be noted at this point, that rotation of the entire actuator assembly excluding the bearing mounting means, in either direction, once stop 20 engages stop 22 is prevented by clamp 42 engaging shoulder 46 on cover 13.

There is thus described a novel demand meter cover mounted reset actuator that limits the amount of torque transmitted to the demand meter reset mechanism, that prevents any bounce of the reset arm 30 when the arm is reset, and that permits the mounting of a demand meter cover actuator on a meter cover with a screw having a right hand thread.

It will be apparent to those skilled in the art from the foregoing description of the invention that various improvements and modifications can be made in it without departing from the true scope of the invention. Accordingly, it is my intention to encompass within the scope of the appended claims the true limits and spirit of my invention.

What we claim as new and desire to secure by Letters Patent of the United States is:

1. A demand meter of the type having a demand register disposed inside a housing, the register being provided with a rotatable demand indicator reset arm with one end adjacent a portion of said housing and mechanically engaging a reset actuator for transferring a reset torque applied outside said housing to said reset arm inside said housing, the improvement comprising said reset actuator, said reset actuator comprising:
   a. a torque shaft passing through said housing for transmitting torque therethrough;
   b. a bearing, mounted to said housing, for rotatably supporting said torque shaft;
   c. a first arm rigidly mounted in an angular relation to said torque shaft near the inner end of and at the longitudinal axis of said torque shaft;
   d. a second arm rotatably mounted in an angular relation near the inner end of said torque shaft, being urged against said first arm by spring means, said second arm being operable to cooperate with the demand indicator reset arm to reset same such that torque applied to said reset arm is limited by said spring means when the combination of said torque shaft and said first arm that is rigidly attached to said torque shaft is rotated through a predetermined angle; and
   e. means for applying a torque to said torque shaft external of said housing wherein torque applied to said torque shaft in excess of that required to rotate said torque shaft and said first arm combination through said predetermined angle is reacted against said housing.

2. An invention as defined in claim 1, wherein said first arm is rigidly mounted to said torque shaft by means of a screw having a right-hand thread and resilient and rigid washers, said washers being mounted concentric with the longitudinal axis of said screw intermediate of said torque shaft and the head of said screw with said resilient washer adjacent said torque shaft.

3. An invention as defined in claim 1, wherein said predetermined angle begins at the point where said indicator reset arm reaches the full reset position and terminates at the point where said torque in excess of that required to rotate said torque shaft and said first arm combination through said predetermined angle, is reacted against said housing.

4. An invention as defined in claim 1, wherein said spring means is a cylindrically shaped torsional spring mounted generally concentric with the longitudinal axis of said torque shaft.

5. An invention as defined in claim 1, wherein said means for applying torque to the torque shaft is a handle pivotally connected to the torque shaft near the outer end of said torque shaft.

* * * * *